July 23, 1968  B. R. ADELMAN  3,393,806
MEMBRANE SUPPORT STRUCTURE
Filed Sept. 24, 1965
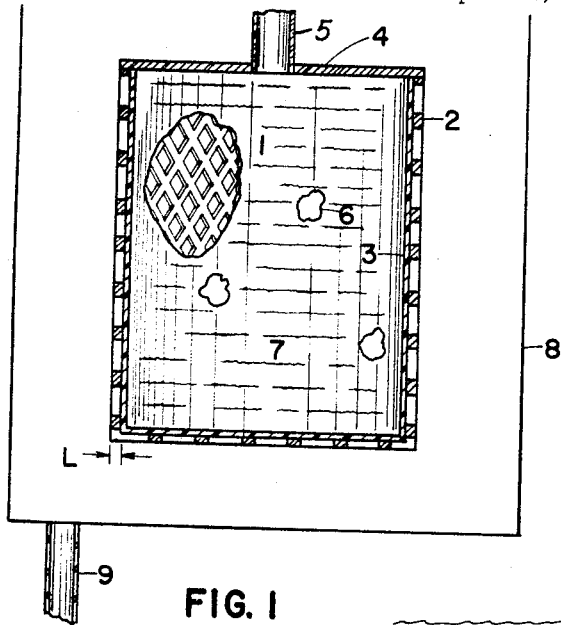
FIG. 1
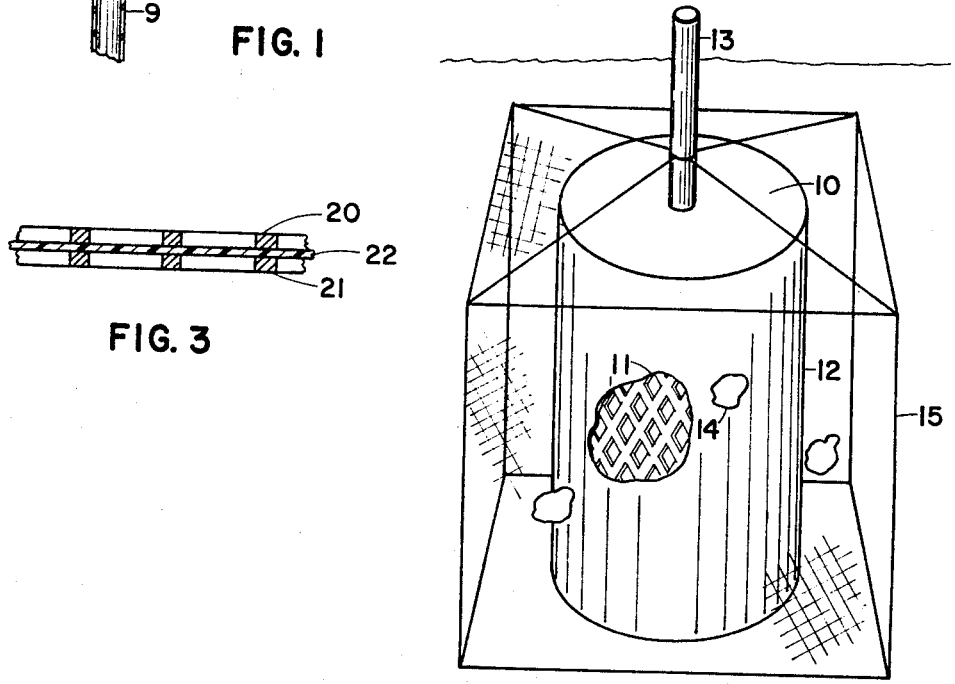
FIG. 3
FIG. 2
BARNET R. ADELMAN
*INVENTOR.*
BY
ATTORNEY

United States Patent Office 3,393,806
Patented July 23, 1968

---

3,393,806
MEMBRANE SUPPORT STRUCTURE
Barnet R. Adelman, Atherton, Calif., assignor to United Aircraft Corporation, East Hartford, Conn., a corporation of Delaware
Filed Sept. 24, 1965, Ser. No. 489,918
6 Claims. (Cl. 210—232)

ABSTRACT OF THE DISCLOSURE

A membrane cell adapted to operate with a pressure differential established thereacross comprising a honeycomb support structure defining a volume and of sufficient strength to withstand the pressure differential, a membrane bonded to the high pressure side of the support and neutrally buoyant bodies larger in size than the holes in the honeycomb disposed in proximity to the high pressure side of said support structure.

---

Background of the invention

This invention relates to membrane support structures for use in processes wherein a fluid is fractionated by diffusion through a membrane, and, more particularly, to a support structure for a membrane employed in a reverse osmosis process for the desalination of water.

Many processes are presently under consideration in an attempt to provide for a simple, economical system for the desalination of sea water to meet the expected increase in the demand for such pure water in the future. Most of these systems are fairly expensive because of the large energy requirements necessary to purify water by the conventional means of evaporation and distillation. Various schemes have been proposed to reduce the cost of such systems by using the waste heat from the phase change from liquid to gas in such systems for the generation of power and, thereby utilize some of the heat and reduce the cost of the overall process for water purification. However, when large amounts of energy are required for these phase changes, the expense of such systems will almost always be quite high. A more promising approach to water desalination in which energy is not required to be put into this system has recently been developed and is called the "reverse osmosis process." This system, basically, utilizes a pressure in excess of the osmotic pressure, which is approximately 350 lbs. per square inch for sea water, to force fresh water, at ambient temperatures, through a selective membrane capable of rejecting the dissolved salts. The process name is derived from the phenomenon whereby the water under an applied pressure driving force flows in the opposite direction to that normally observed in an osmotic experiment where the driving force is the concentration gradient. A more complete description of the basic process of reverse osmosis is contained in the 1963 Saline Water Conversion Report published by the U.S. Department of the Interior, and available from the U.S. Government Printing Office. In such a system, the energy requirements are quite low, and, for example, a reverse osmosis cell can be sunk to a predetermined depth in the ocean, the depth being such that the necessary pressure gradient is established to produce reverse osmosis, and then the only energy necessary is that required to pump the pure water from the cell depth to the surface. In such a system, the rate of pure water production per cell is directly proportional to the pressure gradient across the cell. Also, as is generally true in any processes involving diffusion through a membrane, the rate is approximately inversely proportional to the square of the thickness of the membrane. From these considerations, it is apparent that the rate of pure water production of a particular cell can be increased by either increasing the total surface area of the cell, or by increasing the pressure differential across the cell, or by decreasing the thickness of the membrane. Much research is presently being done on the membranes themselves, and the suitable membranes include certain types of cellulose acetate membranes, as well as membranes formed from synthetic plastic films, however, generally, these membranes are not particularly strong, and any attempt to either increase the surface area of the membrane, or the pressure differential across the membrane, or to reduce the thickness of the membrane results in rupture and tearing of the membranes. Accordingly, one of the chief problems with the use of the reverse osmosis process is the rather low rate of pure water production presently obtainable from the cells.

It is, accordingly, one object of this invention to provide a reinforced membrane structure for a reverse osmosis cell that is capable of withstanding higher pressure differentials.

Another object of this invention is to provide a reverse osmosis cell that can utilize a thinner membrane.

It is another object of this invention to provide a reverse osmosis cell wherein ruptures in the membrane are prevented from propagating across the entire membrane.

It is another object of this invention to provide a reverse osmosis cell which has a capability of sealing should membrane rupture occur.

These and other objects of this invention will be readily apparent from the following description with reference to the accompanying drawings wherein:

FIGURE 1 is a cross sectional view on a longitudinal section through a cell according to one embodiment of this invention, FIGURE 2 is a perspective view, partially broken away, of another embodiment of this invention, and FIGURE 3 is a cross sectional view through the wall structure of another embodiment according to this invention.

Description of the invention

According to one embodiment of this invention, shown in FIGURE 1, the reverse osmosis cell 1 is in the form of a hollow, enclosed geometrical body. The form of the body is not critical, and may be cylindrical, spherical, ellipsoidical, or in the form of a polyhedron. For ease of illustration, the cell of FIGURE 1 is shown as a cylinder. The cell 1 consists of a honeycomb reinforcing structure 2, which is formed into the desired geometrical shape, and the interior of the honeycomb is lined with the diffusion or reverse osmosis membrane 3. For ease of construction, the top of cell 1 is sealed by a metal plate 4 provided with a feed pipe 5 for supplying fluid under pressure to the interior of the cell. It is not necessary, however, that the top surface be sealed by plate 4 and to increase the surface area available for reverse osmosis, the top of cell 1 could also be made from the honeycomb structure 2. The honeycomb structure 2 can be made of any suitable material according to techniques which are well known in the art, and, for example, may be either of metallic or of a synthetic resin, or even of a reinforced paper if desired. The thickness of the honeycomb structure shown by L in FIGURE 1 is chosen so that the honeycomb structure will be able to support or withstand the pressure differential under which the cell is designed to operate. The open area of each honeycomb cellule is chosen so that the total force exerted on the membrane covering the open spaces is within the limit of strength of the membrance chosen. In addition, the membrane 3 is preferably bonded to the honeycomb structure 2, either by heat sealing, or by adhesive means, so that any rupture or tear that occurs within the membrane will not be propagated past the boundary of each individual cellule of the honeycomb structure. In addition, neutrally buoyant bodies 6, slightly larger in size than the open area of each individual cellule of the honeycomb, are distributed within the mass of fluid contained within cell 1; thus, if any tear or rupture occurs in the membrane, a rapid flow of fluid will occur through the individual cellule effected, and this flow of fluid will attract the neutrally buoyant body to the torn cellule and the pressure existing within the fluid will force the neutrally buoyant body into sealing relationship with the wall structure of the cellule, thereby effectively sealing off the torn membrane, and preventing serious contamination of the diffusate which is collecting on the opposite side of the cell. The cell 1 is contained within a tank 8, which is provided with a conduit 9 through which the pure diffused material may be withdrawn and recovered. In operation, salt water to be purified is fed under the desired pressure through conduit 5 into cell 1, pure desalinated water collects within tank 8, and is removed through pipe 9. It is readily apparent that given the knowledge of the strength of a specific membrane 3, the operating pressure can be selected within wide limits by appropriate selection of the web thickness L of the honeycomb structure, and the area of each individual honeycomb cellule. Thus, for a given membrane, if the pressure were desired to be increased, it would be necessary to make each individual cellule smaller and increase the number of cellules. If it were desired to use a thinner membrane, the strength of the membrane would decrease proportionately with the thickness, whereas the diffusion rate would increase inversely with the square of the thickness. Thus, by appropriate selection of the individual cellule size, a thinner membrane may be used at a predetermined pressure differential, and, although the effective area for osmosis may be slightly reduced by the provision of more honeycomb cellules, the total diffusion rate would still be increased as a result of the use of thinner membrane.

In the embodiment of FIGURE 1, the high pressure fluid is contained within the diffusion cell structure, however, it is also possible to have the high pressure fluid on the outside of the cell, as is shown in FIGURE 2. A cell 10, according to FIGURE 2, consists of a honeycomb structure 11 similar to that of FIGURE 1 formed in the shape of a closed geometrical body, and the membrane 12 is applied to the exterior of the honeycomb structure. A pipe 13, extending to near the base of the cell 11, is in sealing relationship with the top of cell 11, and is used to withdraw fluid which diffuses into cell 10 from the surroundings. As in FIGURE 1, the membrane is preferably bonded to the honeycomb surfaces which define the individual cellules. In order to provide leak stoppage in such a system, a screen 15 surrounds the cell 1, and contains neutrally buoyant bodies 14. The screen has a pore size which is smaller than those of neutrally buoyant bodies 14 so that they cannot escape from the cage-like structure formed by thes creen 15. In operation, such a cell would be lowered into the ocean to the depth desired to establish the pressure gradient across the cell, and pure water would diffuse into the cell, and be pumped to the surface. Should a tear occur in the membrane 12, the rapid flow of fluid into the cell would attract one of the neutrally buoyant bodies 14 to the ruptured honeycomb cellule and effectively seal the cellule structure off before substantial contamination of the diffusate occurs.

In some instances, in the operation of the reverse osmosis cell, it becomes necessary to back-flush the membrane. This can occur because of the accumulation of undissolved particles on the surface of the membrane, or because of some cumulative effect upon the chemical structure of the membrane. In such a system a cell similar to those of FIGURES 1 and 2 may be formed in the desired shape using two honeycomb structures with membrane sandwiched inbetween. A cross sectional view through the wall of such a cell is shown in FIGURE 3 wherein the membrane 22 is sandwiched between adjacent honeycomb structures 20 and 21. Such a system then permits reversing the high-pressure and low-pressure sides of the cell and still maintain the advantages set forth for the embodiments of FIGURES 1 and 2. While the invention has been disclosed with respect to specific embodiments thereof, it is obvious that the invention has uses in other embodiments different from those and, therefore, the invention should not be construed as being limited thereto. Modifications and use of equivalent materials in equivalent or similar processess are considered to be within the scope of this invention which is limited only by the following claims wherein

I claim:

1. A cell for selective separation of constituents of a fluid by mass transfer through a semipermeable membrane, said cell having a pressure differential established thereacross comprising:
    (a) a support structure defining a predetermined volume, said support structure comprising a honeycomb defining spaced cellules of predetermined area, said support structure being capable of withstanding the total force created by said pressure differential, the volume defined by said support structure being the high pressure side of the support structure,
    (b) a semi-permeable membrane disposed adjacent the high pressure interior side of the honeycomb structure and bonded thereto at all points of contact of said membrane and said honeycomb so that the pressure differential across said membrane may be transmitted to said honeycomb structure, the area of said cellules being such that the force created on said semipermeable membrane by said pressure differential in the area above said cellules does not exceed the limit of strength of said semipermeable membrane, and
    (c) bodies neutrally buoyant in said fluid disposed within the predetermined volume adjacent the high pressure side of said cell, said neutrally buoyant bodies being larger than the individual honeycomb cellules, so that said individual cellules may be sealed by the neutrally buoyant body in the event of rupture of the membrane.

2. The cell of claim 1 further comprising a second honeycomb support structure disposed coextensive with said honeycomb structure and disposed on the low pressure side of said semipermeable membrane, whereby said membrane is sandwiched between said honeycomb structures and backflushing of said cell is facilitated.

3. A cell for selective separation of constituents of a fluid by mass transfer through a semipermeable membrane, said cell having a pressure differential established thereacross comprising:
    (a) a support structure defining a predetermined volume, said support structure comprising a honeycomb defining spaced cellules of predetermined area, said support structure being capable of withstanding the total force created by said pressure differential, the exterior of said support structure being the high pressure side,
    (b) a semipermeable membrane disposed adjacent the high pressure exterior side of the honeycomb structure and bonded thereto at all points of contact of said membrane and said honeycomb so that the pressure differential across said membrane may be transmitted to said honeycomb structure, the area of said cellules being such that the force created on said semipermeable membrane by said pressure differential in the area above said cellules does not exceed the limit of strength of said semipermeable membrane,
    (c) bodies neutrally buoyant in said fluid disposed adjacent the high pressure side of said cell, said neutrally buoyant bodies being larger than the individual honeycomb cellules, and (d) means for maintaining said neutrally buoyant bodies in proximity to said exterior side so that said individual cellules may be sealed by said neutrally buoyant bodies in the event of rupture of said membrane.

4. The cell of claim 3 further comprising a second honeycomb support structure disposed coextensive with said honeycomb structure and disposed on the low pressure side of said semipermeable membrane whereby said membrane is sandwiched between said honeycomb structures and backflushing of said cell is facilitated.

5. A cell for selective separation of constituents of a fluid by mass transfer through a semipermeable membrane, said cell having a pressure differential established thereacross comprising:

(a) a support structure defining a predetermined volume, said support structure comprising a first honeycomb and a second honeycomb, said honeycombs having walls defining spaced cellules of predetermined area, the walls defining said cellules in said first and second honeycombs being in alignment, said support structure being capable of withstanding the total force created by said pressure differential, and (b) a semipermeable membrane juxtaposed between said first and second honeycombs and in contact with said first and second honeycombs, said membrane being bonded to said first and second honeycombs at all points of contact therewith so that the propagation of a membrane rupture beyond the confines of a cellule is prevented; the area of a cellule being such that the force created on said semipermeable membrane by said pressure differential in the area defined by said cellule does not exceed the limit of strength of said semipermeable membrane, whereby the pressure differential across said membrane may be transmitted to said honeycombs, permitting said cell to be operated with pressure differentials across either side of said membrane.

6. The cell of claim 5 further comprising fluid conducting means communicating with the volume incurred by said support structure.

References Cited

UNITED STATES PATENTS

| 1,805,450 | 5/1931 | Harvey | 210—490 X |
| 2,082,513 | 6/1937 | Roberts | 210—490 |
| 2,611,490 | 9/1952 | Robinson | 210—321 X |
| 2,677,466 | 5/1954 | Lowe | 210—489 |
| 2,960,462 | 11/1960 | Lee et al. | 210—321 X |
| 3,060,119 | 10/1962 | Carpenter | 210—321 X |
| 3,171,808 | 3/1965 | Todd | 210—321 |
| 3,186,917 | 6/1965 | Gerhardt et al. | 210—321 X |
| 3,241,681 | 3/1966 | Pall | 210—499 |
| 3,245,540 | 4/1966 | Johnson | 210—497 X |
| 3,256,996 | 6/1966 | Porter et al. | 210—497 X |

FOREIGN PATENTS

| 597,082 | 4/1960 | Canada. |
| 882,362 | 11/1961 | Great Britain. |
| 938,127 | 10/1963 | Great Britain. |

SAMIH N. ZAHARNA, *Primary Examiner.*

C. DITLOW, *Assistant Examiner.*